United States Patent
Wepfer et al.

(10) Patent No.: US 9,697,919 B2
(45) Date of Patent: Jul. 4, 2017

(54) ANTI-VIBRATION TUBE SUPPORT PLATE ARRANGEMENT FOR STEAM GENERATORS

(75) Inventors: Robert M. Wepfer, Export, PA (US); Padmanabha J. Prabhu, Monroeville, PA (US)

(73) Assignee: WESTINGHOUSE ELECTRIC COMPANY, LLC, Cranberry Township, PA (US)

( * ) Notice: Subject to any disclaimer, the term of this patent is extended or adjusted under 35 U.S.C. 154(b) by 2192 days.

(21) Appl. No.: 12/980,418

(22) Filed: Dec. 29, 2010

(65) Prior Publication Data
US 2012/0167839 A1     Jul. 5, 2012

(51) Int. Cl.
| F28F 9/013 | (2006.01) |
| F22B 1/00 | (2006.01) |
| F22B 37/20 | (2006.01) |
| F28D 7/00 | (2006.01) |
| F28F 9/00 | (2006.01) |
| F28F 9/007 | (2006.01) |
| G21D 1/00 | (2006.01) |
| F22B 1/02 | (2006.01) |

(52) U.S. Cl.
CPC .............. *G21D 1/00* (2013.01); *F22B 1/025* (2013.01); *F22B 37/206* (2013.01); *F28F 9/0131* (2013.01); *Y02E 30/40* (2013.01)

(58) Field of Classification Search
None
See application file for complete search history.

(56) References Cited

U.S. PATENT DOCUMENTS

| 2,876,975 | A | * | 3/1959 | Short ............................. 248/58 |
| 3,437,077 | A | * | 4/1969 | Ammon et al. ................ 122/32 |
| 3,575,236 | A | * | 4/1971 | Romanos ....................... 165/162 |
| 3,625,422 | A | * | 12/1971 | Johnson .......................... 236/58 |
| 3,804,069 | A | | 4/1974 | Bennett |
| 3,896,770 | A | | 7/1975 | Byerley et al. |
| 3,916,843 | A | | 11/1975 | Bennett |
| 4,191,246 | A | * | 3/1980 | Cassell ...................... 165/134.1 |
| 4,195,529 | A | * | 4/1980 | Madoian et al. ................ 73/638 |
| 4,246,958 | A | * | 1/1981 | Sagan et al. ..................... 165/70 |
| 4,312,703 | A | | 1/1982 | Woudstra |
| 4,493,368 | A | | 1/1985 | Gronnerud et al. |
| 4,503,903 | A | | 3/1985 | Kramer |
| 4,554,889 | A | | 11/1985 | Lilly |
| 4,573,526 | A | | 3/1986 | Jung |
| 4,638,768 | A | | 1/1987 | Wetherill |
| 4,747,373 | A | * | 5/1988 | Wepfer et al. ................ 122/510 |
| 4,777,911 | A | | 10/1988 | Wepfer |

(Continued)

OTHER PUBLICATIONS

International Preliminary Report on Patentability for PCT/US2011/064517 dated Jan. 28, 2014 (Forms PCT/IB/373, PCT/ISA/237).

*Primary Examiner* — Gregory Huson
*Assistant Examiner* — Eric Gorman
(74) *Attorney, Agent, or Firm* — Eckert Seamans Cherin & Mellott, LLC; Daniel C. Abeles

(57) ABSTRACT

A means of offsetting semi-circular tube support plates typically present in heat exchangers with cross flow baffles, such as axial flow economizers, utilizing the motive force of steam generator pressurization. The offset slightly flexes the tubes, thereby providing a preload which minimizes the potential for tube vibration and wear.

26 Claims, 9 Drawing Sheets

(56) References Cited

U.S. PATENT DOCUMENTS

| | | | | |
|---|---|---|---|---|
| 4,789,028 A * | 12/1988 | Gowda et al. | | 165/162 |
| 4,813,117 A * | 3/1989 | Wepfer et al. | | 29/890.051 |
| 4,889,679 A * | 12/1989 | Snyder et al. | | 376/258 |
| 4,893,671 A * | 1/1990 | Lagally et al. | | 165/162 |
| 4,919,199 A * | 4/1990 | Hahn | | 165/162 |
| 4,971,751 A * | 11/1990 | David | | 376/273 |
| 4,991,645 A * | 2/1991 | Lagally et al. | | 165/69 |
| 5,028,383 A * | 7/1991 | Moore | | 376/277 |
| 5,042,433 A * | 8/1991 | Monnier | | 122/510 |
| 5,127,469 A * | 7/1992 | Boula | | 165/69 |
| 5,158,162 A * | 10/1992 | Fink et al. | | 188/378 |
| 5,272,739 A * | 12/1993 | Ford | | 376/405 |
| 5,388,638 A * | 2/1995 | Gentry | | 165/162 |
| 5,419,391 A | 5/1995 | Chan et al. | | |
| 5,447,191 A * | 9/1995 | Boula | | 165/69 |
| 5,515,911 A * | 5/1996 | Boula et al. | | 165/69 |
| 5,553,665 A * | 9/1996 | Gentry | | 165/162 |
| 5,570,739 A * | 11/1996 | Krawchuk et al. | | 165/69 |
| 5,692,557 A * | 12/1997 | Gillet et al. | | 165/69 |
| 5,699,395 A * | 12/1997 | Sylvester | | F22B 37/205 122/510 |
| 5,713,412 A * | 2/1998 | Wepfer et al. | | 165/69 |
| 5,752,317 A * | 5/1998 | Keating et al. | | 29/890.044 |
| 5,860,865 A * | 1/1999 | Smith | | 464/180 |
| 6,672,260 B1 * | 1/2004 | Sun | | F22B 37/205 122/510 |
| 7,032,655 B2 * | 4/2006 | Wanni et al. | | 165/162 |
| 7,073,575 B2 * | 7/2006 | Wanni et al. | | 165/162 |
| 7,219,718 B2 * | 5/2007 | Wanni et al. | | 165/162 |
| 7,506,684 B2 * | 3/2009 | Wanni et al. | | 165/162 |
| 2004/0179979 A1 * | 9/2004 | Higbee | | 422/129 |
| 2006/0005787 A1 * | 1/2006 | Sun | | 122/510 |
| 2006/0061092 A1 * | 3/2006 | Keyes | | 285/226 |
| 2007/0089856 A1 * | 4/2007 | Wanni et al. | | 165/69 |
| 2008/0217489 A1 * | 9/2008 | Richard Higbee | | 248/68.1 |
| 2009/0020273 A1 * | 1/2009 | Schneider et al. | | 165/162 |
| 2010/0116478 A1 | 5/2010 | Wann | | |
| 2010/0282448 A1 * | 11/2010 | Singh et al. | | 165/135 |
| 2011/0185726 A1 * | 8/2011 | Burns et al. | | 60/618 |
| 2012/0304466 A1 * | 12/2012 | Wepfer | | 29/890.054 |
| 2013/0340971 A1 * | 12/2013 | Nishioka et al. | | 165/69 |
| 2014/0034269 A1 * | 2/2014 | Shimizu et al. | | 165/69 |

* cited by examiner

ANTI-VIBRATION TUBE SUPPORT PLATE ARRANGEMENT FOR STEAM GENERATORS

BACKGROUND OF THE INVENTION

1. Field of the Invention

This invention relates generally to tube support arrangements for steam generators and more particularly to a tube support arrangement for a tube and shell steam generator that imparts a preload on the tubes.

2. Description of Related Art

A pressurized water nuclear reactor steam generator typically comprises a vertically oriented shell, a plurality of U-shaped tubes disposed in the shell so as to form a tube bundle, a tube sheet for supporting the tubes at the ends opposite the U-like curvature, a dividing plate that cooperates with the tube sheet and a channel head forming a primary fluid inlet header at one end of the tube bundle and a primary fluid outlet header at the other end of the tube bundle. A primary fluid inlet nozzle is in fluid communication with the primary fluid inlet header and a primary fluid outlet nozzle is in fluid communication with a primary fluid outlet header. The steam generator secondary side comprises a wrapper disposed between the tube bundle and the shell to form an annular chamber made up of the shell on the outside and the wrapper on the inside, and a feedwater ring disposed above the U-like curvature end of the tube bundle.

The primary fluid having been heated by circulation through the reactor enters the steam generator through the primary fluid inlet nozzle. From the primary fluid inlet nozzle, the primary fluid is conducted through the primary fluid inlet header, through the U-tube bundle, out the primary fluid outlet header, through the primary fluid outlet nozzle to the remainder of the reactor coolant system. At the same time, feedwater is introduced into the steam generator secondary side, i.e., that is the side of the steam generator interfacing with the outside of the tube bundle above the tube sheet, through a feedwater nozzle which is connected to a feedwater ring inside the steam generator. In one embodiment, upon entering the steam generator, the feedwater mixes with water returning from moisture separators. This mixture, called the downcomer flow is conducted down the annular chamber adjacent the shell until the tube sheet located at the bottom of the annular chamber causes the water to change direction passing in heat transfer relationship with the outside of the U-tubes and up through the inside of the wrapper. While the water is circulating in heat transfer relationship with the tube bundle, heat is transferred from the primary fluid in the tubes to water surrounding the tubes causing a portion of the water surrounding the tubes to be converted to steam. The steam then rises and is conducted through a number of moisture separators that separate entrained water from the steam, and the steam vapor then exits the steam generator and is typically circulated through turbine and electrical generating equipment to generate electricity in a manner well known in the art.

Since the primary fluid contains radioactive materials and is isolated from the feedwater only by the U-tube walls, the U-tube walls form part of the primary boundary for isolating these radioactive materials. It is, therefore, important that the U-tubes be maintained defect free so that no breaks will occur in the U-tubes that will cause radioactive materials from the primary fluid to enter the secondary side; an undesirable result.

Vibration due to fluidelastic excitation of the heat exchanger tubes can result in wear of the walls of the tubes and breach of the pressure barrier between the primary and secondary fluid systems at the locations where the heat exchanger tubes pass through holes in support plates which are axially spaced along the tube bundle to support the tubes. This is especially a problem in axial flow preheaters, that employ a partition plate to separate the secondary side flow into hot leg and cold leg sides to minimize mixing of the warmer recirculating water with the cooler feedwater. This separation is necessary for the feedwater to be heated on the cold leg side of the unit to increase the unit's heat transfer efficiency. However, due to differences in secondary fluid densities, cross flow occurs at the top of the partition plate, with flow generally streaming from the cold leg side towards the hot leg side. This site has been the location of tube wear in several types of preheat steam generators including axial flow, cross flow and counter flow type steam generators.

Accordingly, it is an object of this invention to control tube bundle vibration to avoid wear of the heat exchanger tubes.

Furthermore, it is an object of this invention to control tube vibration in a manner that does not complicate the loading of the heat exchanger tubes through the support plates and into the tube sheet during manufacture or in a cool, depressurized condition.

SUMMARY OF THE INVENTION

These and other objectives are achieved in accordance with this invention by providing a tube and shell steam generator having a primary side for circulating a heated fluid and a secondary side having an axial dimension, for circulating a fluid to be heated by the heated fluid circulating in the primary side. The steam generator includes a channel head for receiving the heated fluid and a tube sheet that separates the channel head from the secondary side. A plurality of heat exchanger tubes respectively extend from the channel head, through the tube sheet and through a portion of the secondary side. A plurality of axially spaced tube support plates are supported in the secondary side approximately perpendicular to the tube axis and have through holes that respectively surround at least some of the heat exchanger tubes extending into the secondary side and through which the corresponding heat exchanger tubes pass, with the holes surrounding each heat exchanger tube, of at least some of the heat exchanger tubes, substantially axially aligned when the steam generator is in a cold condition. A displacement means is provided for laterally offsetting at least one of the tube support plates from one other of the tube support plates when the steam generator is in a hot condition to place a lateral load on the corresponding heat exchanger tubes sufficient to prevent liftoff and, thus, restrain vibration of the tubes.

In one embodiment, at least one of the tube support plates includes two semi-circular support plate halves that are separated by a vertical partition that extends in the axial direction. The displacement means is preferably supported by the vertical partition between the two semi-circular support plate halves. Desirably, the displacement means is supported near or at the upper end of the vertical partition and preferably at the upper end. In the one embodiment, the displacement means is a sealed flexible cavity containing a fluid or a gas/liquid mixture, wherein the cavity is connected to one or both of the semi-circular support plate halves and contracts or expands with changes in pressure inside the steam generator secondary side. Preferably, the displacement means imparts an equal load on the two diametrically opposed halves of the support plates on either side of the vertical partition. In one instance, the sealed flexible cavity is a bellows which may be formed from two concentric corrugated tubes with an annular opening between the corrugated tubes sealed at each end and the corrugated tubes having a central axis that extends substantially orthogonally to the tube axis. The sealed flexible cavity may also have a pressure relief valve and/or a mechanical stop to control the amount of pressure exerted on the tube support plates. Desirably, the displacement means is supported in the tube lane of the heat exchanger tubes and is responsive to a pressurization of the secondary side of the steam generator to laterally offset at least one of the tube support plates. More particularly, the displacement means deflects in response to the pressurization of the secondary side of the steam generator to laterally offset at least one of the two support plates.

In another embodiment, the displacement means is a screw thread or worm gear activated jack.

In still another embodiment, at least some of the support plates are at least in part supported by stay rods that axially extend through openings in the corresponding support plates. Preferably, the stay rod openings are slotted in a direction in which a force is applied by the displacement means for laterally offsetting at least one of the tube support plates so that a strain is not imparted to the stay rods when the support plate is offset. Preferably, movement of the displacement means in the lateral direction is limited to a predetermined distance to control the force applied by the displacement means and desirably that force is limited between one and seven pounds (0.45-3.2 kilograms) and preferably between approximately two and five pounds (0.9-2.3 kilograms) with a displacement desirably between 0.12 and 0.5 inch (3.0 and 12.7 millimeters) and preferably, approximately 0.25 inch (6.4 millimeters).

In still another embodiment, at least one of the tube support plates comprises two support plate halves that are separated by a vertical partition extending in the axial direction and the displacement means is supported by the vertical partition between the two support plate halves. In the latter embodiment, the two support plate halves need not surround all of the plurality of heat exchanger tubes. Preferably, the tubes that are not surrounded by the two support plate halves are on an outer periphery of the secondary side of the steam generator. In the latter embodiment, the heat exchanger tubes are arranged in a tube bundle having a generally circular cross section and the vertical partition divides the tube bundle into hot and cold sides extending a width of the tube bundle with the two support plate halves extending over said width and outward from the vertical partition in a direction transverse to the tube axis to a cord parallel to the partition.

In one embodiment, the displacement means imparts a lateral offset that is elastic so that at least one of the tube support plates returns to its original lateral position when the displacement means force is removed.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
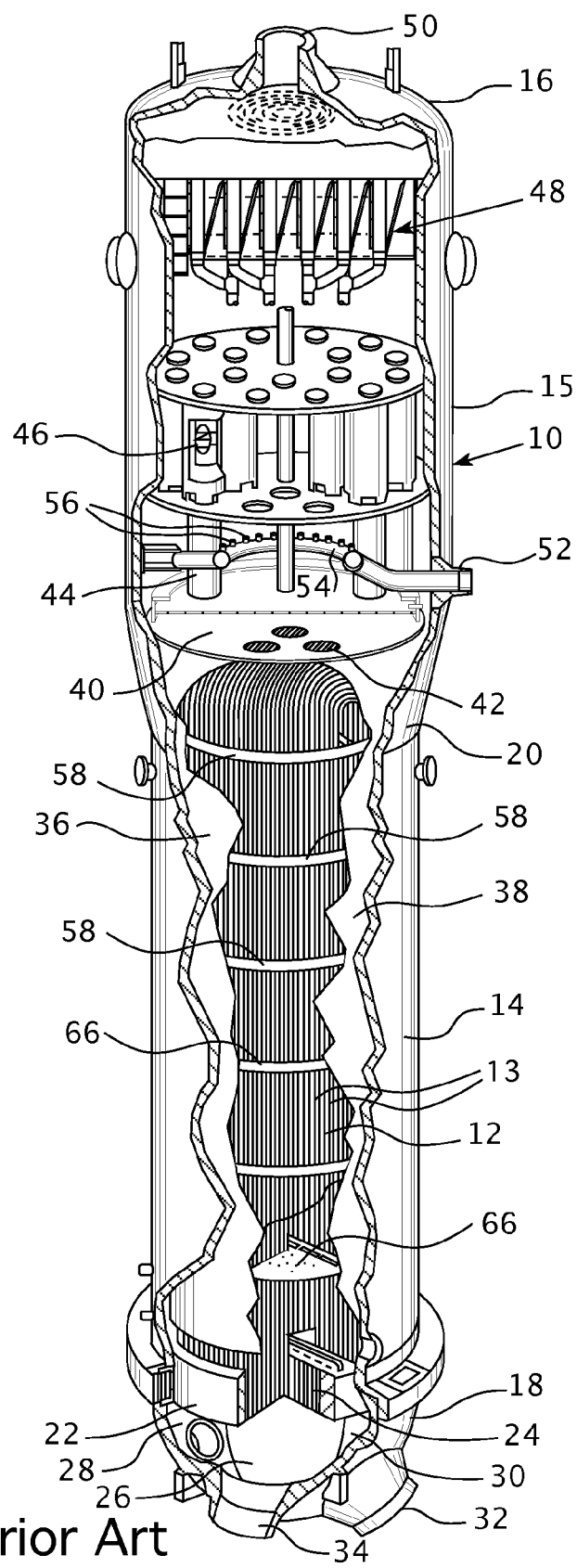
FIG. 1 is a perspective view, partially cut away, of a vertical tube and shell steam generator.

Referring now to the drawings, FIG. 1 shows a steam or vapor generator 10 that utilizes a plurality of U-shaped heat exchanger tubes which form a tube bundle 12 to provide the heating surface required to transfer heat from the primary fluid to vaporize or boil the secondary fluid. The steam generator 10 comprises a vessel having a vertically oriented tubular shell portion 14 and atop enclosure or dished head 16 enclosing the upper end and a generally hemispherical-shaped channel head 18 enclosing the lower end. The lower shell portion 14 is smaller in diameter than the upper shell portion 15 and a frustoconical-shaped transition 20 connects the upper and lower portions. A tube sheet 22 is attached to the channel head 18 and has a plurality of holes 24 disposed therein to receive ends of the U-shaped heat exchanger tubes 13. A dividing plate 26 is centrally disposed within the channel head 18 to divide the channel head into two compartments 28 and 30, which serve as headers for the tube bundle 12. Compartment 30 is the primary fluid inlet compartment and has a primary fluid inlet nozzle 32 in fluid communication therewith. Compartment 28 is the primary fluid outlet compartment and has a primary fluid outlet nozzle 34 in fluid communication therewith. Thus, primary fluid, i.e., the reactor coolant, which enters fluid compartment 30 is caused to flow through the tube bundle 12 and out through outlet nozzle 34.

The tube bundle 12 is encircled by a wrapper 36 which forms an annular passage 38 between the wrapper 36 and the shell and cone portions 14 and 20, respectively. The top of the wrapper 36 is covered by a lower deck plate 40 which includes a plurality of openings 42 in fluid communication with a plurality of riser tubes 44. Swirl vanes 46 are disposed within the riser tubes to cause steam flowing therethrough to spin and centrifugally remove some of the moisture contained within the steam as it flows through this primary centrifugal separator. The water separated from the steam in this primary separator is returned to the top surface of the lower deck plate. After flowing through the primary centrifugal separator, the steam passes through a secondary separator 48 before reaching a steam outlet nozzle 50 centrally disposed in the dished head 16.

The feedwater inlet structure of this generator includes a feedwater inlet nozzle 52 having a generally horizontal portion called feedring 54 and discharge nozzles 56 elevated above the feedring. Feedwater, which is supplied through the feedwater inlet nozzle 52, passes through the feedwater ring 54, and exits through discharge nozzle 56 and, in one prior art embodiment, mixes with water which was separated from the steam and is being recirculated. The mixture then flows down above the lower deck plate 40 into the annular downcomer passage 38. The water then enters the tube bundle 12 at the lower portion of the wrapper 36 and flows among and up the tube bundle where it is heated to generate steam.

As previously mentioned, control of heat exchange tube vibration in the tube bundle 12 is a key requirement in a steam generator and other heat exchanger designs. Vibrations due to fluidelastic excitation can be avoided in accordance with this invention by providing a preload force at least one tube support plate location of sufficient magnitude to prevent tube liftoff. The tube support plates are illustrated by reference character 58 in FIG. 1 and are typically supported by stay rods which extend from the tube sheet in which the ends of the stay rods are threaded, through tubular spacers that extend between adjacent tube support plates, and through openings in each of the axially spaced support plates. The stay rods typically have diameters larger than the heat exchanger tubes and limit deflection of the tube support plates in the unlikely event of an accident, e.g., break loadings of a steamline or feedline of the steam generator. The heat exchange tubes pass through additional openings in each of the tube support plates. Vibration of the heat exchange tubes 13 within the tube support plate openings is the cause of the wear that was previously mentioned, that if unchecked can breach the pressure barrier of the heat exchange tubing.

Although the usefulness of this invention may be evident in many types of heat exchangers, the preferred embodiment described herein is for an axial flow preheat unit for which this invention has particular benefit. Preheat steam generators have a different feedwater inlet structure than is shown in FIG. 1, such that the feedwater is not mixed with the water separated from the steam. In axial flow preheaters, a partition plate 60, shown in FIGS. 2-7 is used to separate shell side flow into hot leg and cold leg sides, to minimize mixing of the warmer recirculation water with the cooler feedwater. This separation is desirable for the feedwater to be heated more efficiently on the cold leg side of the unit. However, due to differences in secondary fluid densities, cross flows occur at the top of the partition plate 60, with flow generally streaming from the cold leg side towards the hot leg side. This site has been the location of tube wear in several types of preheat steam generators.

This invention provides a means of offsetting at least one of the anti-vibration plates 64 or semi-circular tube support plates 66 to provide a preload on at least some of the heat exchanger tubes 13. In one preferred embodiment the mechanism for offsetting the anti-vibration plates 64 or semi-circular tube support plate 66 is a "box" which deforms under pressurization. Alternatively, a number of other mechanism can be employed, such as mechanical screw-type adjusters activated through ports located along the tube lane, or commercially available bellows arrangements can also be used.

Figure 2:
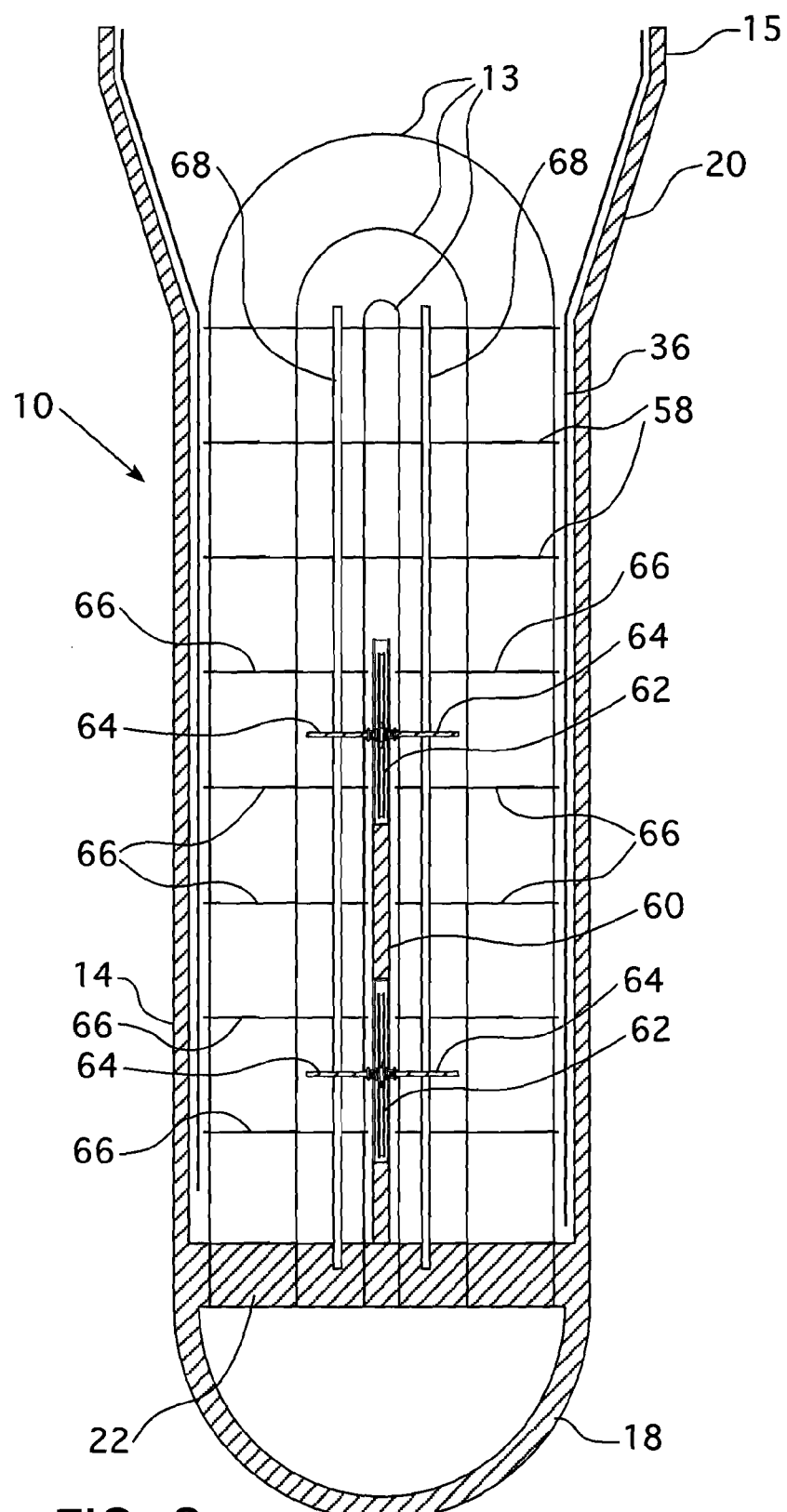
FIG. 2 is a schematic representation of the tube bundle portion of the tube and shell steam generator illustrated in FIG. 1 showing a preheat partition in the secondary side of the steam generator that incorporates one embodiment of the displacement mechanism of this invention.
Figure 3:
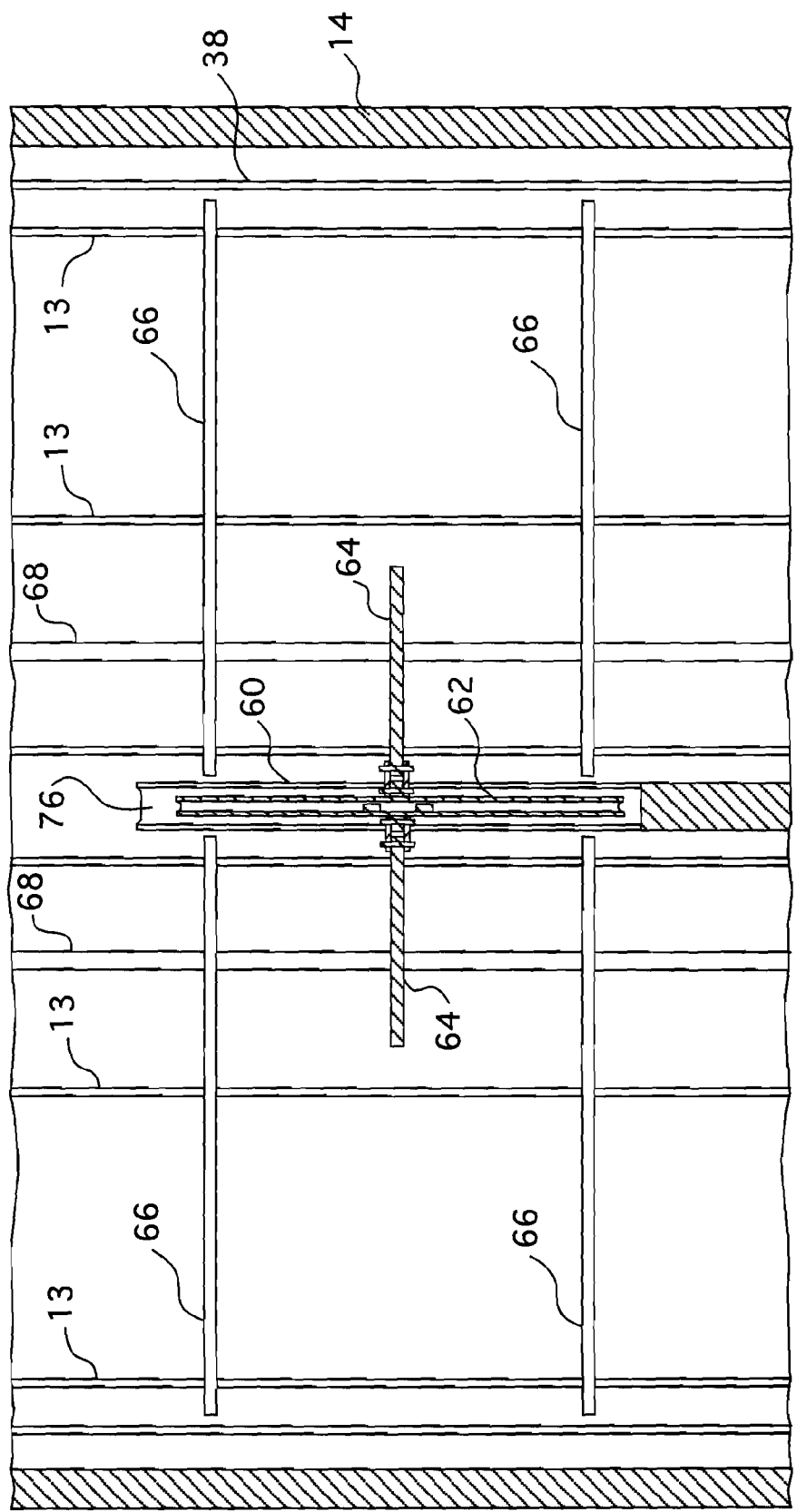
FIG. 3 is an enlarged view of the displacement mechanism portion of FIG. 2, partially in section.
Figure 4:
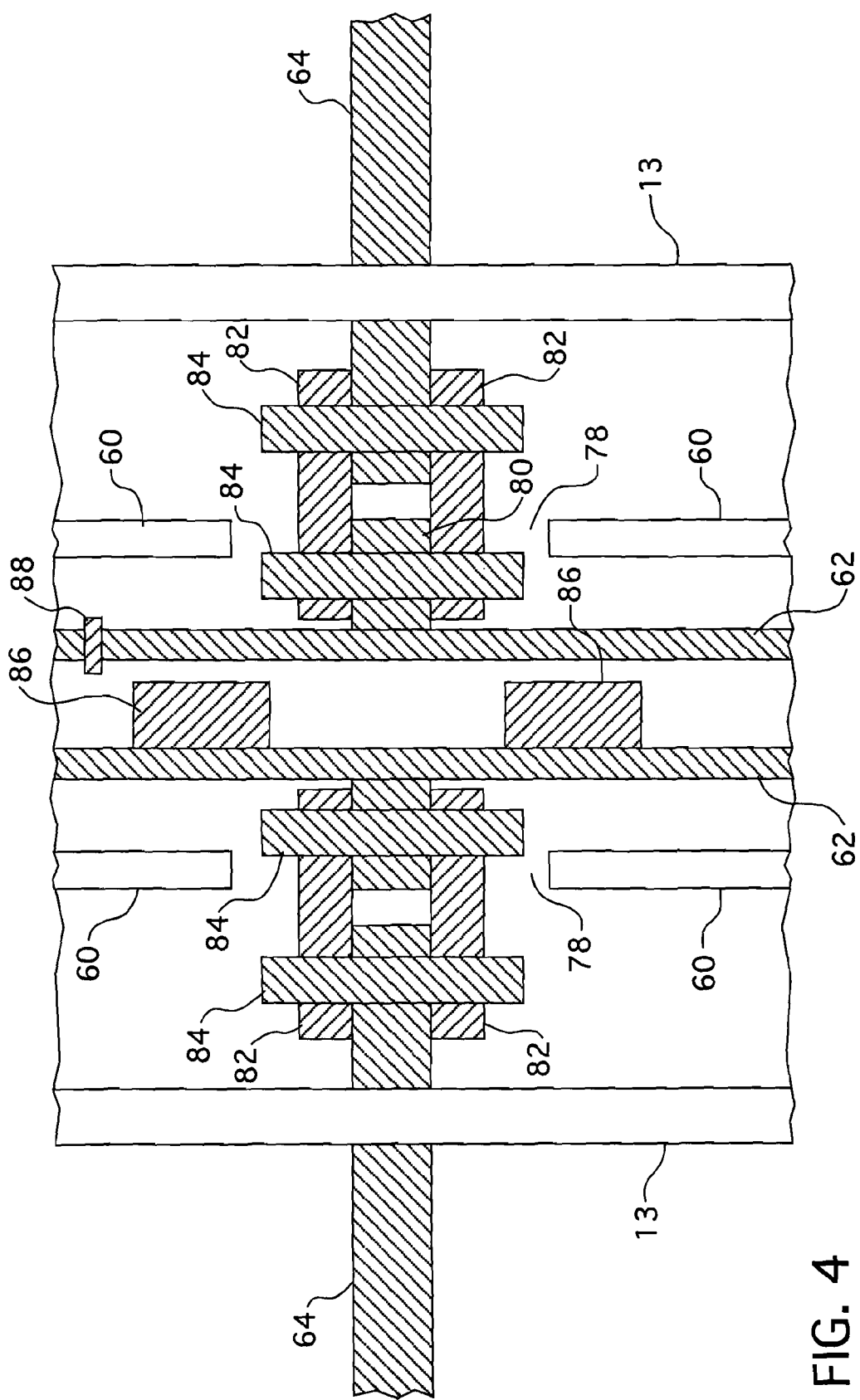
FIG. 4 is a further enlarged view of a portion of FIGS. 2 and 3 illustrating one embodiment of the displacement mechanism of this invention, partially in section.

One preferred configuration for establishing such a preload in accordance with this invention for an axial flow-type preheat steam generator is shown in FIGS. 2, 3 and 4. FIG. 2 illustrates the approximate elevation of anti-vibration plates 64 within the lower shell of a steam generator. The anti-vibration plates are employed in this embodiment to impart the preload on the heat exchange tubes. The partition plate 60 in the FIG. 2 example extends to above the fifth elevation of semi-circular tube support plates 66. However, it should be appreciated that the number of tube support plates may vary depending upon the size of the steam generator. The anti-vibration plates 64 are located in this embodiment between the fourth and fifth half tube support plates. Semi-circular tube support plates 66 are used at all elevations where the partition plate is present, in this example, that is through the fifth tube support plate, counting from the bottom.

Figure 3A:
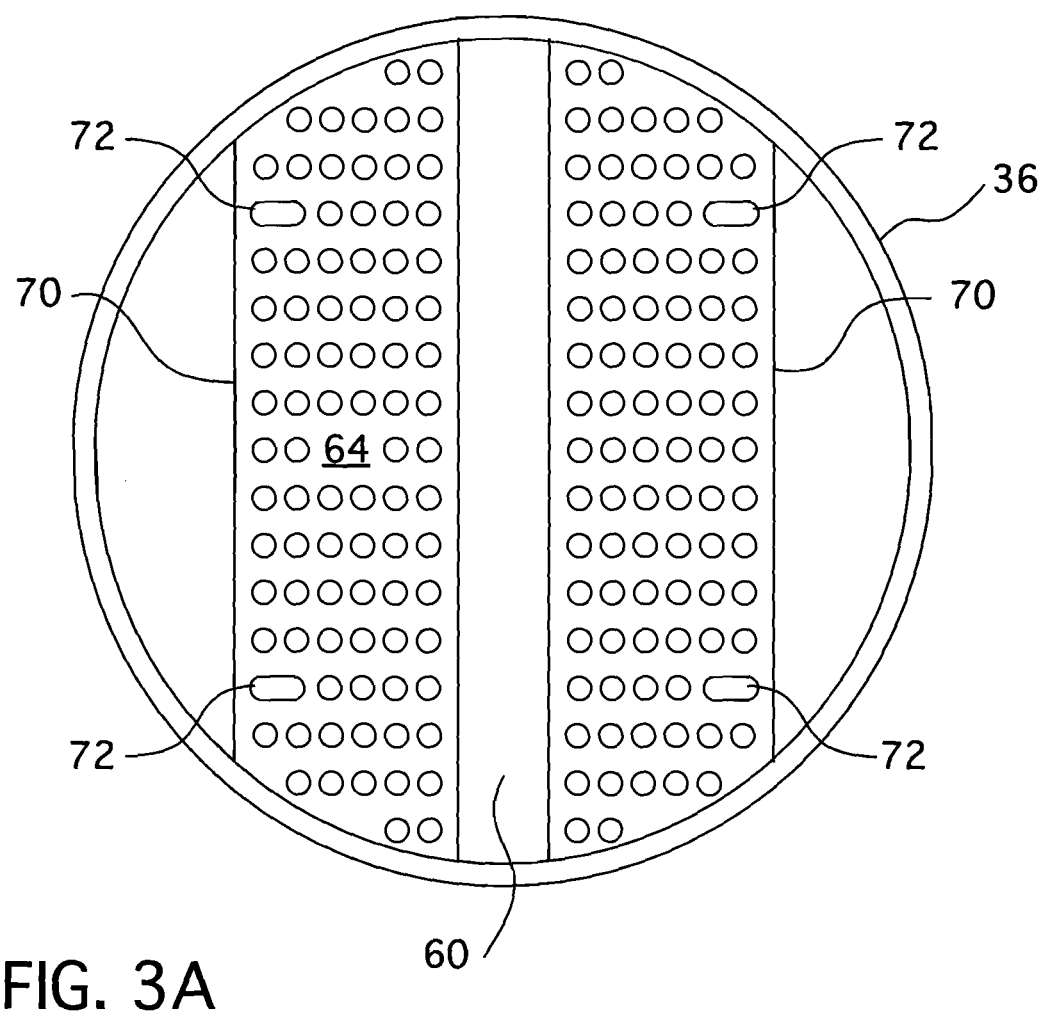
FIG. 3A is a schematic cross-sectional view of the tube bundle of FIG. 3 taken at the anti-vibration plate elevation.

FIG. 3 is a closer view of FIG. 2, though it should be appreciated that only three of the many U-shaped heat exchanger tubes 13 within the tube bundle 14 are shown and only two of the several stay rods 68 are illustrated so as not to obscure the anti-vibration plates 64 and displacement mechanism 62 of this invention. The anti-vibration plates 64 extend laterally, approximately the full width of the partition plate 60 and each extends laterally to a chord 70 (shown in FIG. 3A) parallel to the partition plate 60. Each of the anti-vibration plates 64 need not be a full semi-circle, since cross flow velocities are rapidly attenuated in the region of the tube bundle 12 supported by the anti-vibration plates 64. The anti-vibration plates 64 are supported vertically by the stay rods 68. If needed, the holes in the anti-vibration plates 64 may be slotted for the stay rods 68 as figuratively illustrated by reference character 72 in FIG. 3A. Aside from the slotted holes 72 for the stay rods 68, the anti-vibration plates 64 have similar material, hole size and hole shape as the standard tube support plates 58 and semi-circular tube support plates 66. The upper portion 76 of the partition plate 60 is open to the secondary side environment, and is provided with drain holes and internal stiffening elements, etc., as required.

FIG. 4 shows details of the anti-vibration plate 64 and a preloading box 62 which is one embodiment of the displacement mechanism. The preloading box is welded all around, and filled with air, nitrogen or another gas or other compressible fluid, and is supported from the partition plate 60. Slots 78 in the partition plate 60 permit access to attachment blocks 80. The attachment blocks are welded along the length of the preloading box 62 and transmit the lateral load from the compression of the box 62 to the anti-vibration plate 64. The transfer of a lateral load is accomplished through connector bars 82, installed prior to tubing installation. The connector bars 82 are attached to both the anti-vibration plate 64 and the attachment blocks 80 by connector pins 84. Spacers 86, internal to the preloading box 62, limit deflection to preset limits, and thus limit the extent of the load imparted to the anti-vibration plate 64. Preferably, all elements of the design are welded to prevent loose parts. Various changes to enhance the assembly are possible.

A pressure relief valve 88 may be included to vent the box 62 in the unexpected case of a leak into the box, which would allow the box to vent during a depressurization transient. In the given embodiment, the preloads are statically balanced, i.e., an equal total preload occurs on the hot leg side of the heat exchanger tubes as occurs on the cold leg side of the heat exchanger tubes 13. Should there be a later desire to defeat the preloading of the tubes, this may readily be accomplished by venting the preloading box 62. In this example, the preloading per tube imparted by the preloading box is anticipated to be between approximately one and seven pounds (0.45-3.2 kilograms) per tube or preferably between approximately two and five pounds (0.9-2.3 kilograms) per tube, which should be sufficient to prevent liftoff. The lateral offsets to achieve the foregoing preloads are between approximately 0.12 and 0.5 inch (3.0 and 13 millimeters) and more preferably about 0.25 inch (6.4 millimeters). The heat exchanger tube fatigue and heat exchanger tube bending stress contribution from this preload will be negligible.

Figure 5:
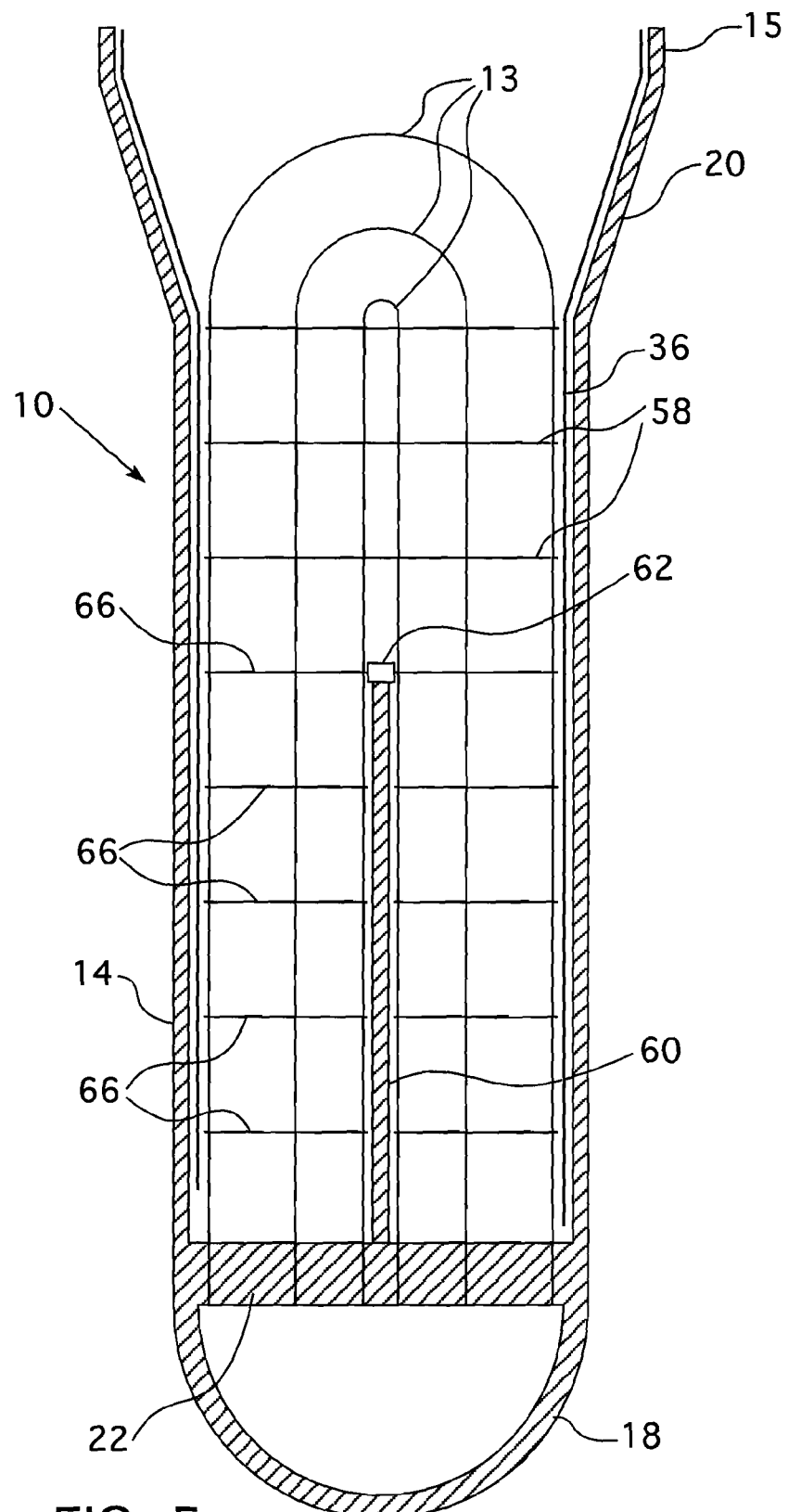
FIG. 5 is a schematic representation of the tube bundle portion of the tube and shell steam generator illustrated in FIG. 1 with a preheater partition incorporating a second embodiment of this invention.

Another embodiment of this invention is illustrated in FIG. 5 which shows the schematic of the steam generator that was previously illustrated in FIG. 2 except that the anti-vibration plates are not used and the displacement box 62 has been moved upward. FIG. 5 illustrates the approximate elevations of the semi-circular tube support plates 66 and the full circular tube support plates 58 within the lower shell 14 of the steam generator 10. The partition plate 60 in FIG. 5 extends to the fifth elevation of semi-circular tube support plates 66. The anti-vibration displacement mechanism 62 is located between the two tube support half plates 66 at the fifth tube support elevation. As before, semi-circular tube support plates 66 are used at all elevations where the partition plate 60 is present.

Figure 6:
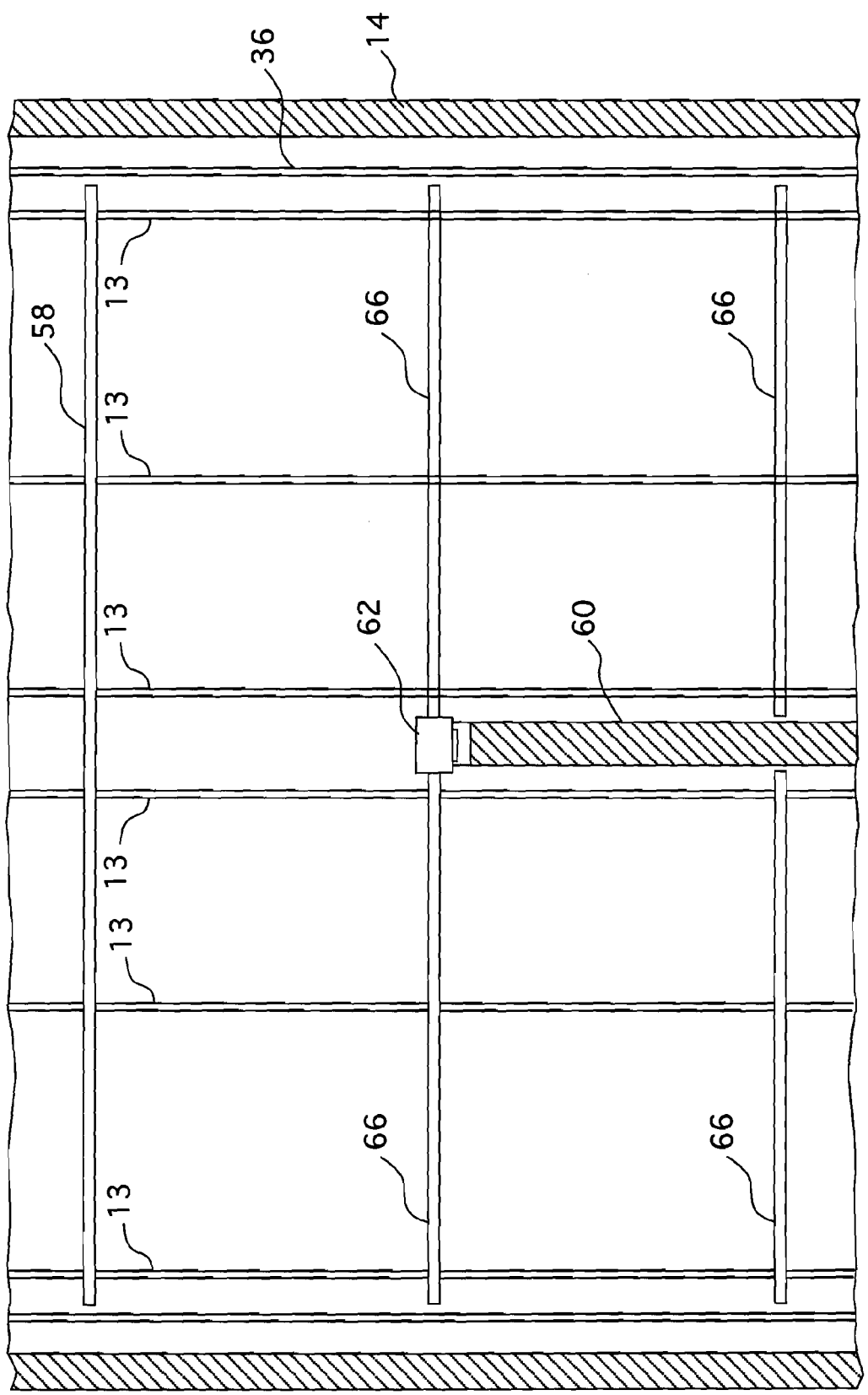
FIG. 6 is an enlarged view of FIG. 5 in the area of the displacement mechanism, partially in section.

FIG. 6 is a closer view of FIG. 5, showing the tube support plates 58 and 66 in the vicinity of the displacement box 62. In this embodiment, the displacement box 62 is cylindrical with approximately a 4.2 inch (107 millimeters) diameter, and an overall length of approximately six inches (150 millimeters), and thus fits into the tube lane region. The displacement box's size and diameter allows that it could be installed and/or serviced, if needed, through six inch (150 millimeters) diameter ports at each end of the tube lane. The displacement box 62 may be attached to either the partition plate 60 or to the tube support plate halves 66, or specially configured attachments may be provided. Since the displacement box 62 is not active during shop assembly, the heat exchanger tubes 13 can be installed through all the tube support plates 58 in line, thereby avoiding scratching of the heat exchanger tubes 13.

Figure 7:
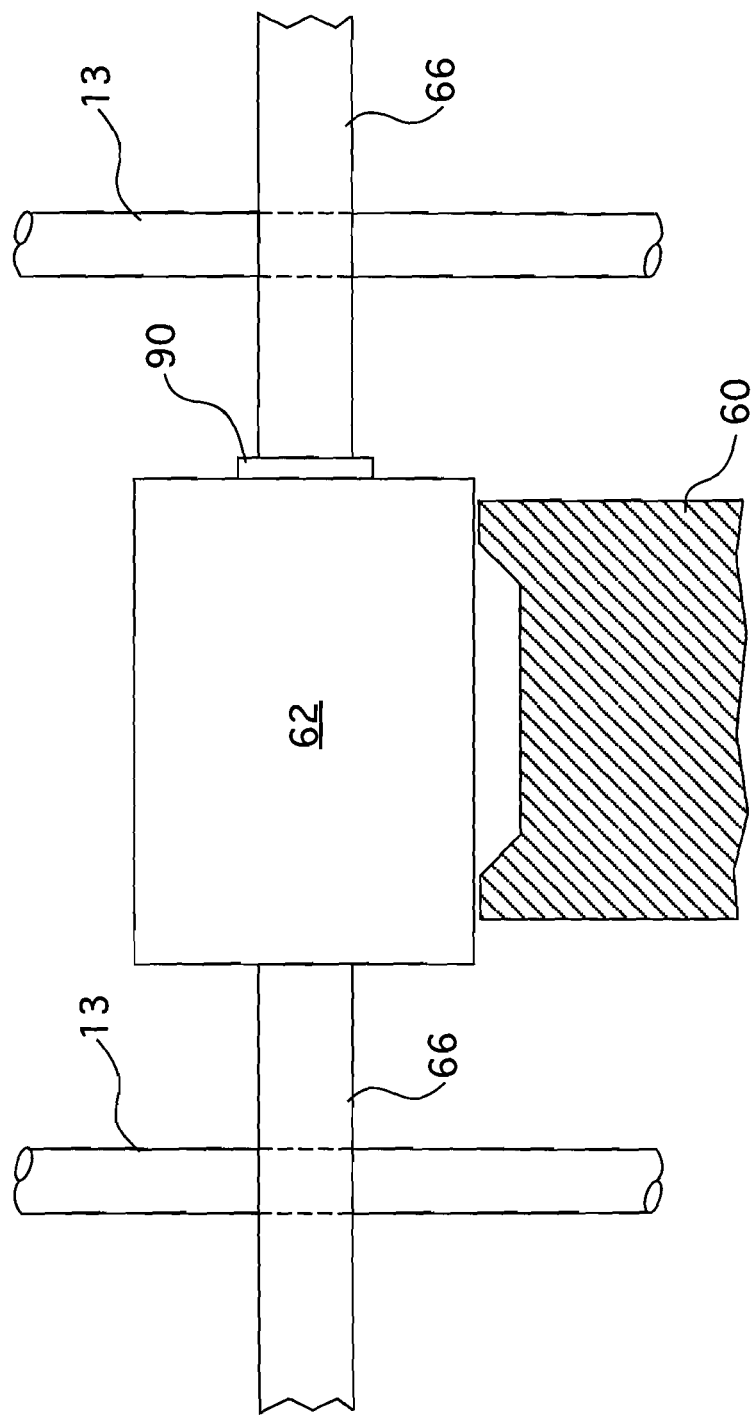
FIG. 7 is a further enlarged view of the displacement mechanism portion of FIG. 6.

FIG. 7 shows a further detail of the displacement box 62 outline. On the right side of FIG. 7, the plunger 90 contacts a tube support plate half plate 66, and on the left side, the displacement box 62 body contacts a tube support plate half plate 66. As previously mentioned, the stay rod holes in the half plate 66 may be slotted to permit lateral movement of the plate without inducing bending stresses in the stay rods 68.

Figure 8:
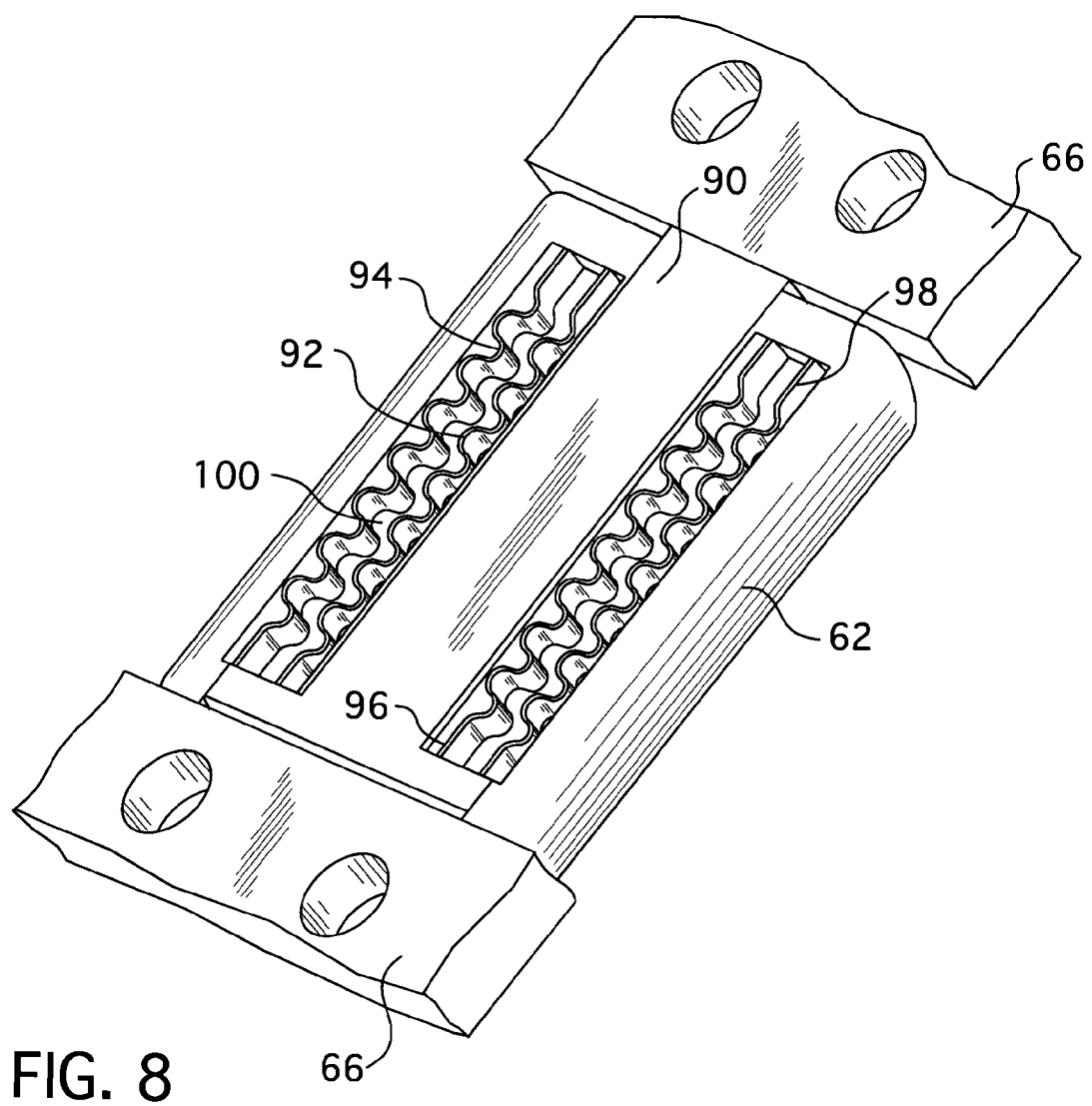
FIG. 8 is a cross sectional view of the displacement mechanism illustrated in FIG. 7 sandwiched between two halves of a tube support plate.

FIG. 8 shows a sectional view of the displacement box 62 through the center line of the tube support plate halves 66. The displacement box in this embodiment has two metal bellows, i.e., an inner metal bellows 92, and an outer metal bellows 94, concentrically positioned. At one end 96 both metal bellows are attached by welding to the plunger pin 90. At the other end 98 the metal bellows are both attached to the displacement box 62 enclosure body by welding. This effectively seals the region between the two bellows, which is filled with atmospheric air or inert gas. Upon steam generator secondary side pressurization, the external pressure acts to compress the air in the annular region 100, producing an axial movement of the pair of bellows (in a direction transverse to the heat exchanger tube axis) and with it the plunger 90 against the semi-circular half support plate 66. The force produced is equal to the secondary pressure times the annular area between the two bellows, minus the spring force acting to compress the bellows.

While specific embodiments of the invention have been described in detail, it will be appreciated by those skilled in the art that various modifications and alternatives to those details could be developed in light of the overall teachings of the disclosure. For example, more than one displacement mechanism may be employed at different elevations of the partition plate as shown in FIG. 2. Accordingly, the particular embodiments disclosed are meant to be illustrative only and not limiting as to the scope of the invention which is to be given the full breath of the appended claims and any and all equivalents thereof.

What is claimed is:

1. A tube and shell steam generator having a primary side for circulating a heated fluid and a secondary side having an axial dimension, for circulating a fluid to be heated by the heated fluid circulating in the primary side, comprising:
   a channel head for receiving the heated fluid;
   a tube sheet that separates the channel head from the secondary side;
   a plurality of heat exchanger tubes that respectively extend from the channel head, through the tube sheet and through at least a portion of the secondary side;
   at least two, axially spaced tube support plates that are supported in the secondary side approximately perpendicular to the secondary side axis and have through holes that respectively surround at least some of the heat exchanger tubes extending into the secondary side and through which the corresponding heat exchanger tubes pass, with the holes surrounding each heat exchanger tube, of the at least some of the heat exchanger tubes, substantially, axially aligned when the steam generator is in a cold condition after having been placed in service; and
   a displacement mechanism responsive to an increase in temperature or pressure on the secondary side to laterally offset at least one of the tube support plates from one other of the tube support plates when the steam generator is in a hot condition to place a lateral load on the corresponding heat exchanger tubes sufficient to prevent lift-off.

2. The steam generator of claim 1 wherein the at least one of the tube support plates comprises two semicircular support plate halves that are separated by a vertical partition extending in the axial direction and the displacement mechanism is supported by the vertical partition between the two semicircular support plate halves.

3. The steam generator of claim 2 wherein the displacement mechanism is supported near or at an upper end of the vertical partition.

4. The steam generator of claim 3 wherein the displacement mechanism is supported at the upper end of the vertical partition.

5. The steam generator of claim 2 wherein the displacement mechanism is a sealed, self-contained, flexible cavity containing a compressible fluid, wherein the cavity is wholly contained within the secondary side and is connected to one or both of the semicircular support plate halves and contracts or expands with changes in pressure inside the steam generator secondary side.

6. The steam generator of claim 2 wherein the displacement mechanism imparts an equal load on two diametrically opposed halves of the support plate on either side of the vertical partition.

7. The steam generator of claim 1 wherein the displacement mechanism is a sealed, self-contained, flexible cavity containing a compressible fluid, wherein the cavity is wholly contained within the secondary side and is connected to one or more of the support plates and contracts or expands with changes in pressure inside the steam generator secondary side.

8. The steam generator of claim 7 wherein the sealed flexible cavity is a corrugated bellows.

9. The steam generator of claim 8 wherein the bellows is formed from two concentric corrugated tubes with an annular opening between the corrugated tubes sealed at each end, the corrugated tubes having a central tubular axis that extends substantially, orthogonally to the secondary side axial dimension.

10. The steam generator of claim 7 wherein the sealed flexible cavity has a pressure relief valve.

11. The steam generator of claim 1 wherein the displacement mechanism is supported in a tube lane of the heat exchanger tubes.

12. The steam generator of claim 1 wherein the displacement mechanism is responsive to a pressurization of the secondary side of the steam generator to laterally offset the at least one of the tube support plates.

13. The steam generator of claim 12 wherein the displacement mechanism deflects in response to the pressurization of the secondary side of the steam generator to laterally offset the at least one of the tube support plates.

14. The steam generator of claim 1 wherein at least some of the support plates are at least in part supported by stay rods that axially extend through openings in the corresponding support plates, wherein the stay rod openings are slotted in a direction which is substantially perpendicular to a tube lane of the heat exchanger tubes.

15. The steam generator of claim 1 wherein movement of the displacement mechanism in the lateral direction is limited to a predetermined distance.

16. The steam generator of claim 1 wherein the lateral load on the corresponding heat exchanger tubes is between approximately 1 and 7 pounds (0.45-3.2 kg).

17. The steam generator of claim 16 wherein the lateral load on the corresponding heat exchanger tubes is more preferably approximately 2-5 pounds (0.9-2.3 kg).

18. The steam generator of claim 1 wherein the lateral offset of the at least one of the tube support plates is between approximately 0.12 and 0.5 in (3.0 and 13 mm).

19. The steam generator of claim 18 wherein the lateral offset of the at least one of the tube support plates is approximately 0.25 in (6.4 mm).

20. The steam generator of claim 1 wherein the displacement mechanism comprises a plurality of spreaders acting on the at least one of the tube support plates.

21. The steam generator of claim 20 wherein each of the spreaders is positioned at differing heat exchanger tube elevations.

22. The steam generator of claim 1 wherein at least one of the tube support plates comprises two support plate halves that are separated by a vertical partition extending in the axial direction and the displacement mechanism is supported by the vertical partition between the two support plate halves, wherein the two support plate halves do not surround all of the plurality of heat exchanger tubes.

23. The steam generator of claim 22 wherein the heat exchanger tubes not surrounded by the two support plate halves are on an outer periphery of the secondary side of the steam generator.

24. The steam generator of claim 23 wherein plurality of heat exchanger tubes comprise a tube bundle having a generally circular cross section and the vertical partition divides the tube bundle into a hot and a cold side extending a width of the tube bundle with the two support plate halves extending over said width from the vertical partition in a direction transverse to the secondary side axis to a chord parallel to the partition.

25. The steam generator of claim 1 wherein the offset of the tube support plate is elastic and returns to its original condition when a force imparted by the displacement mechanism for the lateral offset is withdrawn.

26. The steam generator of claim 1 wherein the displacement mechanism includes a sealed, self-contained, flexible cavity containing a compressible fluid and a mechanical stop that controls the extent of the flexure of the cavity, wherein the cavity is wholly contained within the secondary side and is connected to the at least one of the tube support plates and contracts or expands with changes in pressure inside the steam generator secondary side and the mechanical stop controls the extent of a force imparted by the sealed flexible cavity on the at least one of the tube support plates.

* * * * *